INVENTORS.
ROGER H. FOURNIER
GLOVER C. JOYCE
HAROLD A. SCHMUCKI
BY
ATTORNEY

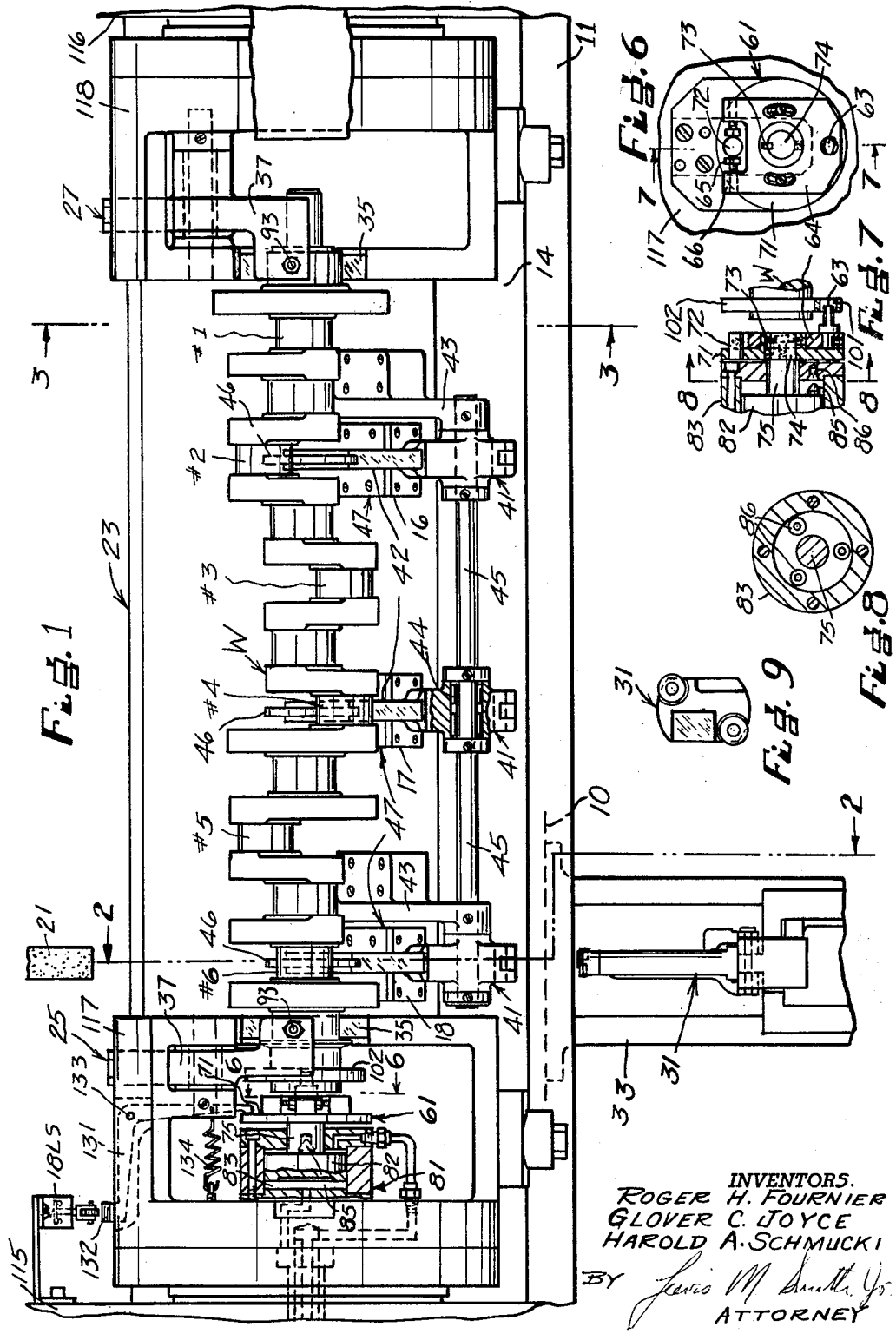

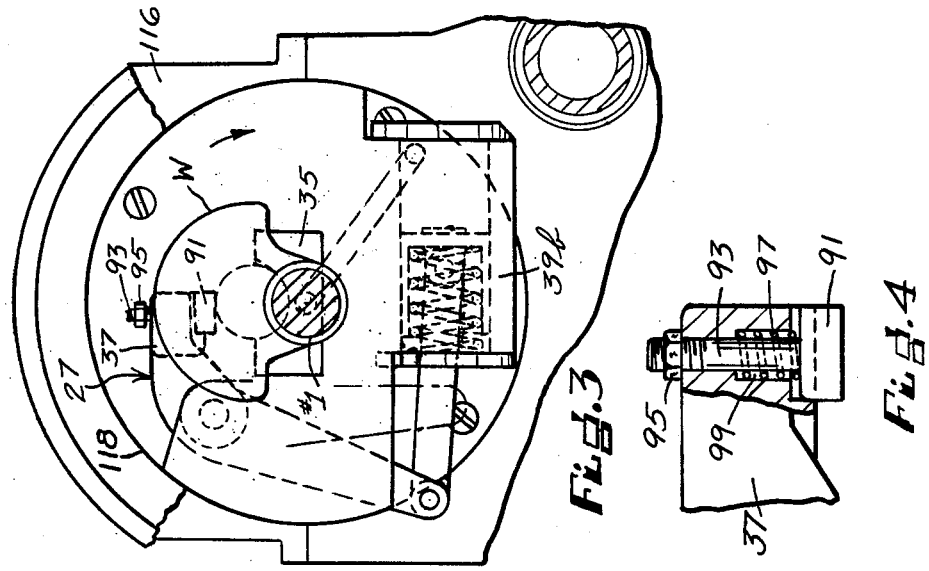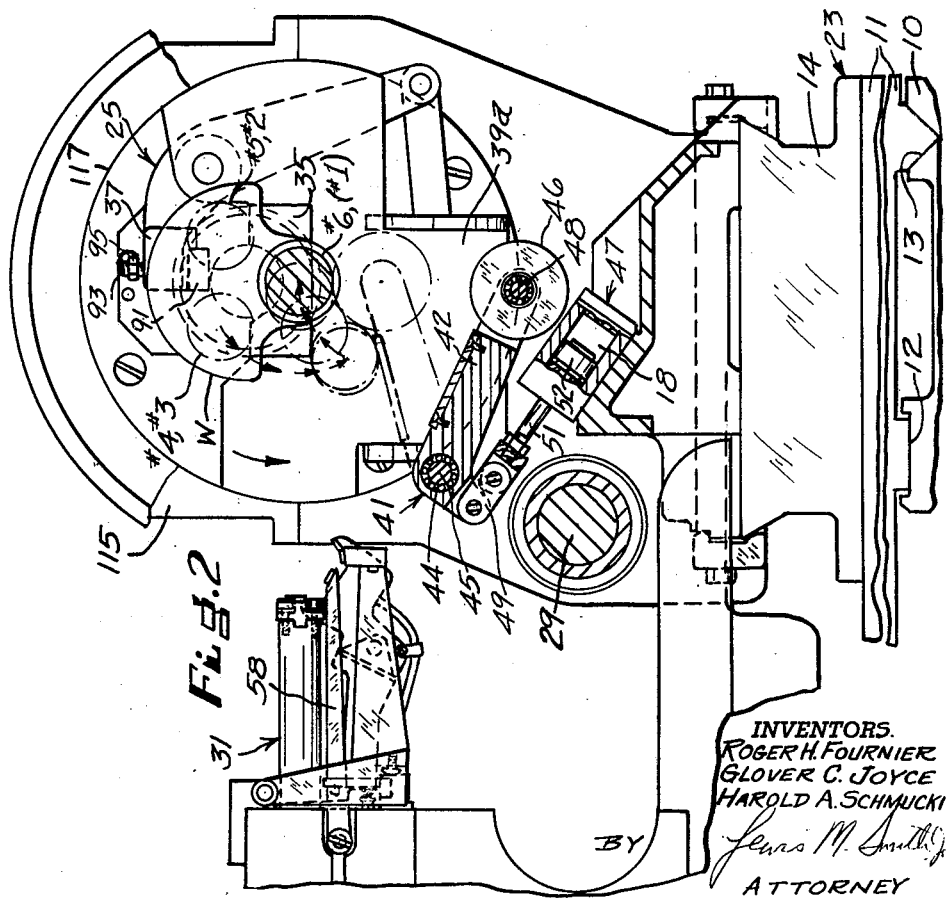

United States Patent Office 3,142,941
Patented Aug. 4, 1964

3,142,941
GRINDING MACHINE
Roger H. Fournier, Millbury, Glover C. Joyce, Worcester, and Harold A. Schmucki, Holden, Mass., assignors to Norton Company, Worcester, Mass., a corporation of Massachusetts
Filed Oct. 3, 1962, Ser. No. 228,038
20 Claims. (Cl. 51—105)

This invention relates to a grinding machine, and more particularly to apparatus for incorporation on a crankshaft grinding machine operable automatically between successive crankpin grinding operations to index a crankshaft angularly as required to dispose each crankpin in the proper position for a grinding operation thereon.

While means operable automatically to index an elongated work piece axially thereof between successive grinding operations on longitudinally spaced portions of a work piece have been well known in the art for several years, concurrent efforts to provide effective means automatically operable to angularly index a work piece such as a crankshaft characterized by multiple angularly offset eccentric portions have not met with a comparable degree of success. The latter undertaking is rendered more difficult by the fact that the required angular indexing operation is preferably performed while the work piece to be indexed continues to rotate about the axis of rotation of the work piece holders rotatably supporting the work piece.

This invention contemplates the provision of angular indexing means operable automatically between successive grinding operations as required and through the angular distance necessary to place successive eccentrically disposed portions of a work piece in the proper position for successive grinding operations performed on the respective eccentric portions of a workpiece. The instant invention also contemplates angular indexing means for a work piece capable of automatic operation concurrent with automatic operation of axial indexing means for displacing an elongated work piece as required to perform successive grinding operations on longitudinally spaced portions of a work piece.

This invention further contemplates clamping means for securing a work piece in rotatable work piece holders selectively operable during grinding operations to fixedly secure a work piece against rotation relative to rotating work piece holders and alternatively operable during an angular indexing operation to constrain but not fixedly secure a work piece against angular rotation relative to the rotating work piece holders supporting the work piece.

In a typical crankpin grinding machine such as that illustrated in Mader Patent 2,723,503, granted November 15, 1955, a crankshaft is rotatably supported upon a pair of spaced aligned work heads 15 and 16 by means of a pair of pot chucks 17 and 18 releasably supporting a crankshaft eccentrically of the work heads 15 and 16 by means of bearings 60 and 70 and clamping jaws 61 and 71 for rotation about the axis of the crankpin to be ground. Since the respective crankpins of a crankshaft are angularly offset, the crankshaft supported in the grinding machine must be rotated relative to the pot chucks after each crankpin is ground in order to bring the axis of the next crankpin to be ground into alignment with the axis of rotation of the work heads.

In its simplest configuration the automatic angular indexing means characterizing the instant invention consists of a straight edged camming element mounted upon the base of the grinding machine in the plane of the grinding wheel for movement into and out of the path of the crankshaft between a retracted position clear of the crankshaft and an operative position in the path of the next crankpin to be ground in which the straight edged camming element is disposed chordwise of the work heads at a distance from the center of rotation of the work heads equal to the radius of the crankpin to be ground. Before the camming element is moved to its operative position, the means securing the crankshaft relative to the pot chucks must be released sufficiently to permit constrained rotation of the crankshaft relative to the pot chucks in response to engagement of a crankpin with the camming element while maintaining the crankshaft securely in the pot chucks. Under these conditions, the rotation of the work holders will bring the crankpin to be ground into engagement with the camming element and thence along the camming surface of that element into the proper position for the grinding operation. However, with the camming element mounted for movement in the plane of the grinding wheel as described above, the angular indexing operation performed by this camming element cannot be initiated until after a crankshaft has been indexed axially to place the crankpin to be ground in axial alignment with the grinding wheel.

At the other extreme, the instant invention can be embodied in an arrangement including a number of camming elements equal to the number of crankpins all mounted on a work traversing table equivalent to swivel table 14 in Mader Patent 2,723,503 so that each camming element is maintained continuously in axial alignment with the crankpin to be indexed thereby. With such an arrangement, the angular indexing operation for each crankpin can be performed concurrently with the axial indexing operation for each crankpin in order to minimize the time delay between successive grinding operations.

In the case of crankshaft configurations having more than one crankpin disposed on a common axis, as described below and illustrated in the accompanying drawings, it is possible to achieve the advantage of the second configuration described above with a reduced number of camming elements by providing one camming element continuously disposed in axial alignment with one crankpin in each group of coaxially disposed crankpins and operable each time a crankpin in that group is to be angularly indexed into the proper position for a grinding operation.

An object of this invention is the provision of angular indexing means for a work piece rotatably supported in a machine tool operable while a work piece is rotating to displace a work piece angularly relative to the rotating supports therefor so as to properly dispose successive angularly offset eccentric portions of a work piece for machining operations thereon.

Another object is the provision of automatic angular indexing means for a crankshaft rotating in a crankpin grinding machine operable to position successive angularly offset crankpins on the axis of rotation of the rotating work piece holders for grinding operations on the respective crankpins.

Still another object of this invention is the provision of angular indexing means for crankpin grinding machines automatically operable as required by the configuration of a given crankshaft in the grinding machine to rotate such a crankshaft relative to the supports therefor through the requisite different angular distances necessary to dispose successive crankpins in the proper positions for grinding operations thereon.

Yet another object of this invention is the provision of means for rotatably supporting a crankshaft in a grinding machine including clamping means for securing a crankshaft fixedly against rotation relative to the supporting means therefor during a grinding operation selectively automatically operable during an automatic angular indexing operation to frictionally constrain a crankshaft against rotation relative to the supporting means therefor in order to permit precisely controlled relative angular displacement of a crankshaft by angular indexing means operable while the crankshaft is rotating with the supporting means therefor.

A further object is the provision of means associated with means automatically operable to axially index a crankshaft in a crankpin grinding machine operable to bypass automatic angular indexing means for a crankshaft when successive crankpins to be ground are disposed on a common axis.

A final object of this invention is the provision of apparatus for axially and angularly indexing a crankshaft while it is rotating with supporting means therefor in a crankpin grinding machine, wherein angular indexing through the angle between successive crankpins in the direction of rotation is effected by the interaction of means constraining a crankpin against rotation relative to the supporting means therefor overpowered by a crankpin camming element arranged to coact with a predetermined eccentric portion of a crankshaft so as to bias the next crankpin to be ground into the proper position for the grinding operation thereon.

Other objects and advantages of the instant invention will be readily apparent from the following description considered in relation to the showing in the accompanying drawings wherein:

FIG. 1 is a plan view partially broken away of the preferred embodiment of the instant invention as applied to a typical crankpin grinding machine, FIG. 2 is a vertical section partially broken away taken substtantially on line 2—2 of FIG. 1, FIG. 3 is a vertical section partially broken away taken substantially on line 3—3 of FIG. 1, FIG. 4 is a detail partially in section of the retractable portion of the work piece clamp assembly shown in FIG. 3, FIG. 5 is a schematic diagram of the hydraulic system and the electrical circuits by means of which the preferred embodiment of the instant invention is associated with a crankpin grinding machine along with a simplified schematic representation of the hydraulic system and the electrical circuits of a typical crankpin grinding machine.

FIG. 6 is a detailed view taken substantially on line 6—6 of FIG. 1 showing the preferred embodiment of means for precisely positioning a crankshaft angularly relative to the supporting means therefor.

FIG. 7 is a vertical section taken on line 7—7 of FIG. 6,

FIG. 8 is a vertical section taken on line 8—8 of FIG. 7, and

FIG. 9 is an end view of the preferred embodiment of the end-wise locator showing the disposition of the opposed camming rolls.

Figure 5:
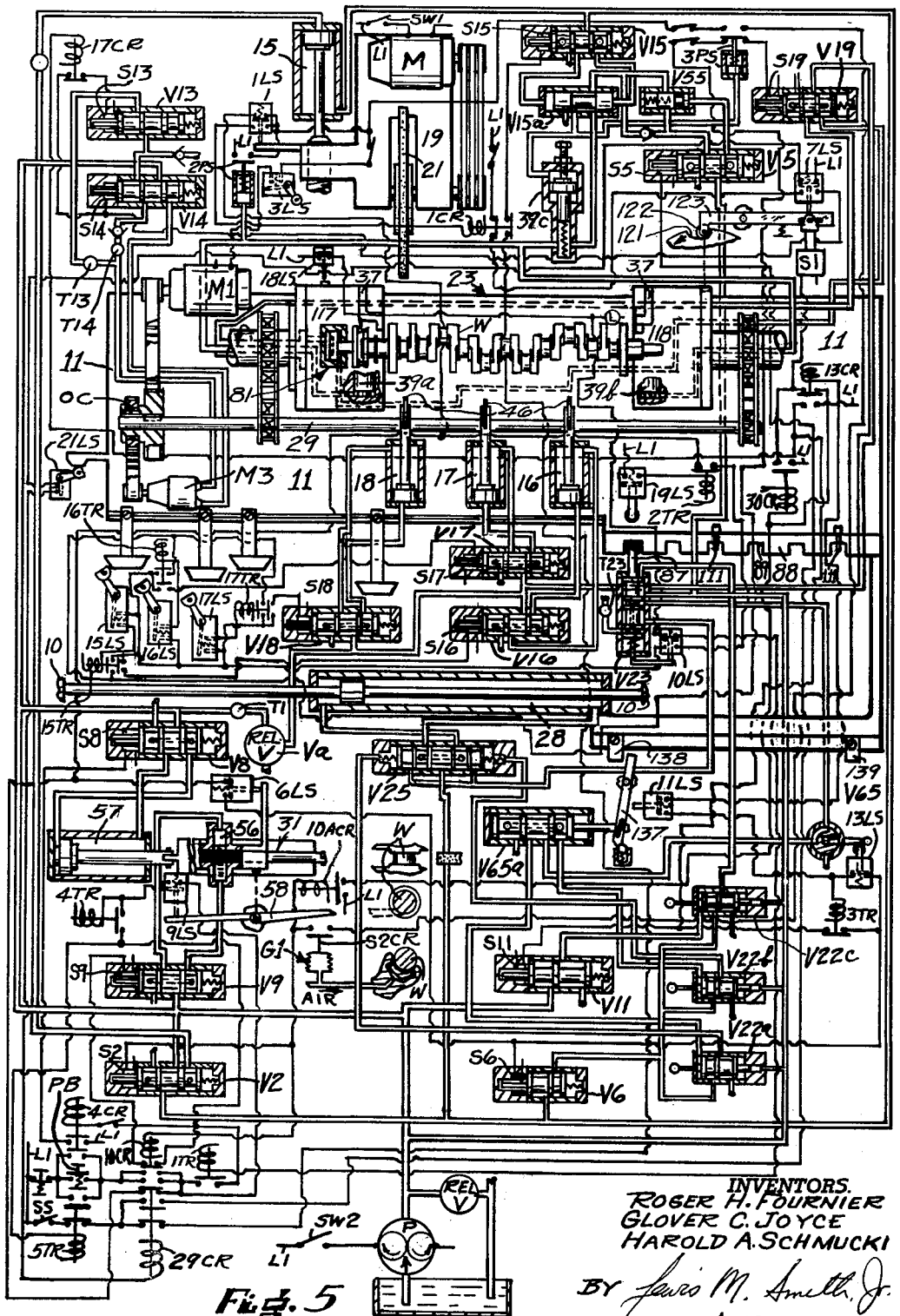

Referring now to the drawings wherein like reference numerals refer to like or corresponding parts, FIG. 1 shows a representative six pin crankshaft W supported by a pair of spaced coaxial pot chucks 117 and 118 in the proper position for the performance of a grinding operation on pin #6 of the crankshaft by means of grinding wheel 21 of a typical crankpin grinding machine such as that illustrated in Mader Patent 2,723,503 referred to above. It is to be understood that the respective pot chuck assemblies 117 and 118 illustrated in FIG. 1 are mounted upon the face plates of a pair of work heads 115 and 116 in turn fixedly secured to a traversing table assembly 23 for movement therewith axially of the grinding wheel 21 in the manner and for the purpose described in Mader Patent 2,723,503. It is to be further understood that the illustrated grinding wheel 21 is rotatably supported on a wheel slide 19 by a suitable wheel spindle assembly for feeding movement into and out of engagement with the respective crankpins of crankshaft W as illustrated in Mader Patent 2,723,503 in response to the operation of a suitable wheel feeding mechanism interconnecting the wheel slide 19 and the base 10 of the grinding machine which also supports the table assembly 23. The work piece clamping assemblies 25 and 27 shown in FIG. 1 and illustrated in greater detail in FIGS. 2 and 3 correspond generally to those illustrated and described in Mader Patent 2,723,503.

The combined end-wise locator, steadyrest and gage assembly 31 shown in FIG. 1 is slidably supported on a suitable supporting arm 33 in turn fixedly secured to the base 10 of the grinding machine by attachment bolts illustrated in FIG. 1 or by other suitable means. The combined end-wise locator, steadyrest and gage assembly 31 may conveniently be constructed and operated according to the description and the accompanying illustrations in patent to Joyce, No. 3,076,298, dated February 5, 1963, except that the opposed camming surfaces of the end-wise locating element described in the patent to Joyce are preferably replaced with a pair of freely rotatable opposed camming rolls as illustrated in FIG. 9 in order to minimize wear since this invention contemplates the operation of the end-wise locator with the work piece W rotating.

The showing in FIG. 1 also includes a plan view of three camming element assemblies 41 for angularly indexing the work piece W respectively supported upon the table assembly 23 in axial alignment with pins #2, #4 and #6 of the crankshaft W by means of a pair of brackets 43 for rotation about a common shaft 45 in response to individual actuating means 47 for the respective camming element assemblies 41. The relationship between the respective camming element assemblies 41 and the respective actuating means 47 therefor, best illustrated in FIG. 2, will be described further below in relation to the showing in FIG. 2.

Finally, FIG. 1 shows a plan view of the angular positioning assembly 61 selectively operable to secure the crankshaft W in various precisely predetermined angular positions relative to the pot chuck assemblies 117 and 118. In addition, FIG. 1 shows a plan view partially in section of the clutch assembly 81 associated with the angular positioning assembly 61 and selectively operable to release the angular positioning assembly 61 for free rotation relative to the pot chuck assemblies 117 and 118. FIGS. 6, 7 and 8 illustrate further details of the angular positioning assembly 61 and the clutch assembly 81 associated therewith.

Referring particularly to the showing at the left hand end of FIG. 1 and to the related detailed showings in FIGS. 6, 7 and 8, it will be seen that the crankshaft W is located in a precise predetermined angular relation to the pot chucks 117 and 118 in a conventional manner by means of a locating hole 101 in the flange 102 formed integrally with the crankshaft W arranged to receive a locating pin 63 projecting from a yoke 64 which may be precisely angularly adjusted relative to the circular plate 71 by adjustment of an opposed pair of adjusting screws 65 threadably engaging the arms 66 of the yoke 64 so that the adjusting screws 65 may be rotated into clamping engagement with an alignment pin 72 projecting from the plate 71. The plate 71 is in turn secured by the key 73 to a stub shaft 74 formed integrally with or otherwise fixedly secured to a piston rod 75 in turn formed integrally with or secured to the piston 82 slidably supported within the cylinder 83 fixedly secured to the back face of the pot chuck 17 and forming the housing of the actuating assembly 81.

The clutch assembly 81 includes the hydraulically actuated piston 82 both slidable and rotatable within the cylinder 83 and provided with a tapered precision angular locating pin 85 projecting from the right hand face of the piston 82 as seen in FIGS. 1 and 7 for engagement with one of a plurality of precisely shaped and positioned recesses 86 in the internal surface of the right hand end of the cylinder 83 as seen in FIGS. 1 and 7. From the showing in FIG. 8, it will be evident that the number and the angular spacing of the respective recesses 86 corresponds to the number and angular spacing of the several axes on which the respective crankpins of the crankshaft W are located. With the piston 82 disposed at the right hand end of the cylinder 83 as shown in FIG. 1, the locating pin 85 is fully engaged with one of the recesses 86 so that the angular positioning assembly 61 is fixedly secured in a predetermined precise angular relationship to the pot chuck 117 with the result that the crankshaft W is similarly secured by the engagement of pin 63 with the locating hole 101. With the piston 82 disposed at the left hand end of the cylinder 83 as shown in FIG. 7, the locating pin 85 is fully disengaged from the cylinder 83 so that the angular positioning assembly 61 is freely rotatable relative to the pot chuck 117. From the showing in FIG. 7, it will be seen that the pin 63 is long enough to remain in engagement with the locating hole 101 in the flange 102 when the angular positioning assembly 61 is moved to the left with the piston 82 to which it is secured, so that the desired predetermined angular relationship between the angular positioning assembly 61 and a given crankshaft W is maintained throughout the time that the crankshaft is supported in a crankpin grinding machine incorporating the instant invention.

As shown best in FIG. 2, the traversing table assembly 23 may conveniently comprise a longitudinally traversable work table 11 slidably supported upon the base 10 of the grinding machine by means of a flat way 12 and a parallel V-way 13, in turn supporting a swivel table 14 adjustably fixedly secured thereto supporting the work heads 115 and 116 synchronously rotated by a drive means including the shaft 29 corresponding to drive means including shaft 55 as shown and described in Mader Patent 2,723,503.

From the showing of the work piece clamping assembly 25 in FIG. 2 and the showing of the work piece clamping assembly 27 in FIG. 3, it will be evident that these clamping assemblies include half bearings 35 mounted eccentrically of the respective pot chuck assemblies 117 and 118 to support main bearings of the crankshaft W so that successive crankpins may be positioned coincident with the axis of rotation of the work heads 115 and 116 for the grinding operation thereon. It will also be evident that these clamping assemblies include releasable clamping jaws 37 coacting with the half bearings 35 to secure a work piece in the pot chucks 117 and 118 for rotation therewith. It is to be understood that the clamping jaws 37 may conveniently be actuated by the hydraulic cylinders 39a and 39b in the manner illustrated and described in Mader Patent 2,723,503.

The instant invention additionally includes in the hydraulic control system for the clamping assemblies means selectively operable to maintain the clamping jaws 37 in engagement with a crankshaft W by supplying hydraulic fluid to the cylinders 39a and 39b at a relatively reduced pressure so that a crankshaft may be rotated relative to the pot chucks 117 and 118, notwithstanding the frictional restraint exerted by the clamping jaws 37, by the automatic indexing means of the instant invention. In order to facilitate individual adjustment of the frictional restraint exerted by each of the clamping jaws 37 under the relatively reduced pressure, each of these clamping jaws includes a resiliently supported auxiliary clamping element 91 which may conveniently be secured to the clamping jaw 37 as illustrated in detail in FIG. 4 by means of a threaded stud 93 engaged by an adjustable stop nut 95 constraining a biasing spring 97 encircling the stud 93 and confined within a suitable annular recess 99 within the clamping jaw 37. With the arrangement described above controlled in the manner described in detail further below, the crankshaft is maintained securely in engagement with the pot chucks 117 and 118, not only during the grinding operations, but also during intervening angular indexing operations.

As illustrated in FIG. 2, each camming element assembly 41 includes a bell crank 42 rotatably supported on the shaft 45 by means of a suitable ball bearing assembly 44. The long arm of the bell crank 42 is forked at its outer end to receive a camming roller 46 rotatably supported by a suitable bearing assembly 48, and the short arm of the bell crank 42 is pivotally connected to a link 49 in turn pivotally connected to the outer end of a piston rod connected to a piston enclosed by the cylinder 18 of the actuating assembly 47 for the camming element assembly 41.

The camming element assembly 41 illustrated in FIG. 2 is shown in solid lines in its retracted position clear of a crankshaft W supported in and rotating with the pot chucks 117 and 118, while its operative position is indicated by a dot-dash outline of the camming element assembly 41 in the position it assumes when hydraulic fluid under pressure is directed to the left hand end of the cylinder 18 of the actuating assembly 47 as shown in FIG. 2.

Crankpin #6 of the crankshaft W is shown in FIG. 2 in the proper position for a grinding operation thereon with its axis coincident with the axis of rotation of the work heads 115 and 116. It will be evident from the showing in FIGS. 1 and 3 that crankpin #1 of the crankshaft W illustrated is disposed coaxially with crankpin #6 so that either of these pins may be positioned for the grinding operation by timely actuation of the camming element assembly 41 illustrated in FIG. 2 which is disposed in alignment with pin #6. The angular orientation relative to pin #6 of coaxial crankpins #4 and #3 is indicated in FIG. 2 by a dot-dash circle identified as #4, #3 since these crankpins are not actually visible in the sectional view illustrated in FIG. 2. Similarly, the angular orientation relative to pin #6 of coaxial crankpins #5 and #2 is indicated in FIG. 2 by a dot-dash circle identified as #5, #2 since these crankpins are not actually visible in the sectional view illustrated in FIG. 2.

A typical angular indexing operation is illustrated in FIG. 2 by a series of arrows indicating the path of the axis of crankpins #4 and #3 and a series of dot-dash circles representing one of these crankpins disposed in successive positions along the long arm of the bell crank 42 and along the circumference of the camming roller 46, both as seen in the dot-dash representation of the camming element assembly 41 in its operative position.

Thus, while the work heads 115 and 116 continue to rotate in the usual direction about their common axis of rotation with a crankshaft W frictionally constrained for rotation therewith by the clamping jaws 37 actuated by hydraulic fluid under a relatively reduced pressure, the engagement of a crankpin initially eccentric to the rotation of the work heads 115 and 116 with a suitable camming element 41 in its operative position will produce additional rotation of the crankshawt W in the opposite direction about the axis of the main bearings of the crankshaft W as the crankpin engaged by the camming element assembly 41 or a crankpin coaxial therewith is positively displaced from the initial eccentric position to a position coincidental with the axis of rotation of the work heads 115 and 116 for a grinding operation thereon.

The frictional constraint on the crankshaft W exerted by the clamping jaws 37 during an indexing operation in response to relatively reduced hydraulic pressure on cylinders 39a and 39b is important in two respects. On one hand, this frictional constraint assures rotation of the crankshaft W with the pot chucks 117 and 118 until a crankpin is engaged by a cooperating camming element assembly 41 disposed in its operative position. On the other hand, this frictional constraint permits rotation of the crankshaft W relative to the pot chucks 117 and 118 as long as the operative camming element assembly 41 is exerting an angular biasing effect on the crankshaft W through the crankpin in engagement with the camming element assembly 41.

As indicated above, the apparatus comprising the instant invention is preferably incorporated in a typical crankpin grinding machine which preferably includes means automatically operable to actuate the traversing table assembly 23 between successive grinding operations in order to position the next crankpin to be ground substantially in axial alignment with the grinding wheel 21 and also includes a suitable endwise locating mechanism such as that illustrated in FIGS. 1 and 2 and described in detail in the patent to Joyce referred to above operable automatically before the clamping jaws 37 are tightened for a grinding operation to effect precise axial alignment of the crankpin to be ground, for spark splitting purposes. The automatic operation of these features in coordinated relation to the apparatus comprising the instant invention and to the successive grinding operations is described further below in relation to the schematic showing in FIG. 5.

Since the automatic axial indexing means embodies various basic features already generally well known in the art, including a table traversing cylinder 28 and a hydraulic control system therefor cooperating by means of an hydraulically actuated plunger 87 with a notch bar 88 provided with a suitably spaced series of notches 89, these basic features will be described only in connection with the showing in FIG. 5 discussed in detail further below. The automatic table traversing mechanism illustrated in FIG. 5 and described further below is generally conventional to the extent that it is operable in one direction to effect successive axial indexing operations and in the opposite direction at the end of a complete grinding cycle to return the traversing table assembly 23 to the starting point for the next complete grinding cycle to be performed on a subsequent crankshaft W.

The automatic apparatus illustrated schematically in FIG. 5 and described further below is necessarily arranged to perform a large number of related operations concurrently wherever possible to save time and otherwise according to a predetermined critical sequence. By virtue of its complexity, such an automatic system tends to become relatively inflexible not only as to the various operations performed, but also with respect to the particular sequence in which the various different operations are performed. However, the configuration of a work piece may either dictate or permit predetermined variations in the repetitive operating cycle performed by a system such as that illustrated schematically in FIG. 5.

For example, while an angular indexing operation is normally required either concurrent with or following the necessary axial indexing operation between grinding operations on successive angularly offset crankpins, no angular indexing operation is required whenever crankpins ground successively are disposed coaxially. Referring particularly to the crankshaft W illustrated in FIGS. 1, 2 and 3, it will be evident that no angular indexing operation is required between the grinding operation on crankpin #1 at the end of one full cycle of operation and the grinding operation on crankpin #6 at the beginning of the next full cycle of operation, since the grinding operation on crankpin #6 of one crankshaft immediately succeeds the grinding operation on crankpin #1 of the previous crankshaft. Similarly, no angular indexing operation is required between the grinding operation on crankpin #4 and the grinding operation on crankpin #3 of any given crankshaft since crankpin #3 is ground immediately after crankpin #4 coaxial therewith.

Accordingly, in the interest of the most efficient operation of the apparatus shown in FIG. 5 for the illustrated configuration of the work piece W, it is desirable to provide a modified cycle of operation for the apparatus illustrated between the grinding operation on crankpin #1 of one shaft and crankpin #6 of the successive shaft and also between the grinding operations on crankpin #4 and crankpin #3 of a given shaft so that the angular indexing operation usually performed concurrently with the axial indexing operation is eliminated. This selective variation of the indexing operations can be provided as required by plungers 111 slidably supported on notch bar 88 so that they project into the notches 89 corresponding to the respective grinding positions for crankpin #4 and crankpin #1. Each of plungers 111 is displaced when the axial indexing plunger 87 enters the notch 89 into which that particular plunger projects with the result that the normally open contacts of a limit switch 19LS disposed in alignment with the plunger 87 are closed to energize a time delay relay 2TR and thereby by-pass the means controlling the next angular indexing operation and the various other operations necessarily coordinated therewith as described in greater detail further below.

Thus, it will be seen that the disposition of the respective plungers 111 in relation to selected notches 89 in the notch bar 88 is such that the axial indexing operation for shifting the traversing table assembly 23 from the position for grinding crankpin #1 of one crankshaft W to the position for grinding crankpin #6 of the successive crankshaft W and the axial indexing operation for shifting the traversing table assembly 23 and a crankshaft W supported thereby from the position for grinding crankpin #4 to the position for grinding crankpin #3 will not be accompanied by an angular indexing operation and other related operations unnecessary in each of these instances in view of the fact that the next crankpin to be ground is disposed coaxially with the previous crankpin ground.

Since the automatic angular indexing device characterizing the instant invention and the automatic axial indexing device selectively interconnected with the angular indexing device to inactivate the angular indexing device as described above are both actuated by control systems preferably fully coordinated with the control means for the various components of an automatic crankpin grinding machine, the control means for the devices comprising the instant invention are illustrated in FIG. 5 in operative relation to schematic representations of the various essential components of an automatic crankpin grinding machine and the various control means therefor.

Similarly, since the significance of the novel features of the instant invention is best appreciated when these features are considered in relation to a typical crankpin grinding machine in which these features are incorporated, the brief descriptions provided above of the operation of the devices comprising the instant invention are amplified in the following detailed description of the operation of the complete system schematically illustrated in FIG. 5.

While the operation of this system is described below as dependent upon the manual actuation of a push button PB to initiate a full cycle of grinding operations on all of the crankpins of a given crankshaft W, it is to be understood that this cycle could alternatively be initiated entirely automatically whenever a fully ground work piece is removed from the grinding machine and replaced by a work piece to be ground by a suitable work piece loading and transfer mechanism such as that illustrated and described in Narel et al. Reissue Patent No. 24,885 based on Patent 2,813,380, issued November 19, 1957.

In a fully automated machine including such a work piece loading and transfer mechanism, the loading and transfer mechanism would be actuated automatically upon completion of a complete grinding cycle when the wheel slide supporting the grinding wheel 21 is retracted, and the completion of the work piece unloading and loading operations by the loading and transfer mechanism would initiate the next complete grinding cycle automatically.

In order to facilitate the use of an autotomatic work piece loading and transfer mechanism such as that illustrated and described in Reissue Patent 24,885, the locating hole 101 in the flange 102 of the crankshaft W may be replaced with a notch open to the periphery of the flange so that the crankshaft W can be deposited in the clamping assemblies 25 and 27 with the locating notch properly positioned for engagement with the locating pin 63. On the other hand, if the locating hole 101 must be retained in preference to a notch, the clutch assembly 81 can be modified to include a selectively actuated long stroke for the piston 82 effective during the unloading and loading operation to displace the angular positioning assembly 61 as shown in FIG. 7 further to the left to fully disengage the locating pin 63 from the locating hole 101.

The showing of the grinding wheel feed mechanism and the control circuit therefor in FIG. 5 is a simplified schematic representation of such a system since this mechanism forms no part of the invention. However, it is to be understood that the devices characterizing the instant invention are useful with various suitable feed mechanisms and control circuits therefor already well known in the art.

*Operation*

In FIG. 5, the various machine elements as well as the various components of the hydraulic system and the electrical circuits are shown in their normal positions, that is with hydraulic pressure and electrical power absent which would otherwise cause the various components controlled thereby to be in positions opposite to those shown. However, FIG. 5 does show a crankshaft W that has been loaded into the machine with traversing table 23 in a right hand position as seen in FIG. 5 with crankpin #6 of the crankshaft W positioned opposite the grinding wheel 21 and on the axis of rotation of the work heads 115 and 116.

When the customary line switches, not illustrated in FIG. 5, are closed, power is supplied to line L1 to energize the electrical circuits. Starting switch SW2 is closed to start the hydraulic pump P to deliver fluid under pressure to the hydraulically operated elements of the apparatus illustrated in FIG. 5. Starting switch SW1 is closed to start the grinding wheel motor M to rotate the grinding wheel 21.

As is typical of such apparatus, the control circuits for initiating a grinding operation may be interlocked with the angular position of the pot chucks 117 and 118 by a suitable circular camming element concentric with one of the work heads provided with a depressed camming surface 121 to receive a follower roll 122 rotatably supported on a pivotally supported lever 123 for engagement with the depressed camming surface 121 when the pot chucks 117 and 118 are disposed in the proper angular position for unloading and loading work pieces and hence for initiating a grinding cycle. The lever 123 as shown in FIG. 5 is normally spring biased in the counterclockwise direction so that the lever 23 actuates a limit switch 7LS to close its normally open contacts as the follower roller 122 enters the depressed camming surface 121.

When the normally open contacts of limit switch 7LS are closed as shown in FIG. 5, the control relay 29CR is energized through the normally open now closed contacts of limit switch 21LS, closing the normally open contacts and opening the normally closed contacts of control relay 29CR. The closing of the normally open contacts of control relay 29CR supplies power to the selector switch SS and the normally closed contacts of time delay relay 5TR to energize solenoid S5 so that valve V5 is shifted to the right to pass hydraulic fluid effective to move valve V55 to the left. With the valve V55 so disposed, the hydraulic cylinders 39a and 39b of the respective clamping assemblies 25 and 27 are connected to the exhaust side of the system so that the clamping jaws 37 are disposed in their open positions.

The schematic electrical and hydraulic diagram in FIG. 5 shows, for simplified illustrative purposes only, one cylinder 39c and a single valve V15a connected in series and thence to both cylinders 39a and 39b. However, it is to be understood that each one of the pressure lines leading to the pot chuck cylinders 39a and 39b is in fact preferably connected to one of a pair of identical cylinders 39c each connected in series with one of a pair of identical valves V15a, both in turn connected to the valves V15, V55 and V5 interconnected as shown in FIG. 5. The provision of parallel circuits to the respective cylinders 39a and 39b will insure that both clamping jaws 37 will open a predetermined amount and that the operation of the clamping jaws 37 can be adjusted individually.

When the plunger 87 which may be provided with a pivotally mounted roller as shown in FIG. 5 is seated in one of the notches 89 of notch bar 88, as illustrated in FIG. 5, the normally open contacts of limit switch 10LS are held closed to energize a time delay relay 1TR through the normally closed contacts of limit switch 18LS. After a short time interval, if the contacts of limit switch 18LS are not meanwhile opened in the manner described further below, the normally open contacts of time delay relay 1TR close to set up a circuit for starting the complete grinding cycle.

In addition, fluid under pressure is supplied to cylinder 15 through valve V2 to hold the wheel slide 19 in its retracted position as shown in FIG. 5; to cylinder 57 through valve V8 to hold the end-wise locator, steadyrest and gage assembly 31 in its retracted position as shown in FIGS. 1, 2 and 5; to cylinder 56 through valve V9 to hold the end-wise locator rotated into its inoperative position as shown in FIG. 5 and as seen best in FIG. 9; to cylinder 83 of the clutch assembly 81 through valve V19 to lock the angular positioning assembly 61 against rotation relative to the pot chuck 17 as shown in FIG. 5 and as seen best in FIG. 1; and to the cylinders 16, 17 and 18 of the respective camming element actuating means 47 through the valves V16, V17 and V18 respectively in order to hold the respective camming element assemblies 41 in their retracted positions as shown in FIG. 5 and as illustrated best in FIG. 2.

Finally, hydraulic fluid under pressure is also supplied directly to the valves V22a, V22b and V22c, holding these valves to the left as seen in FIG. 5; to the left hand side of each valve V15a through valve V15 holding the spool of that valve to the right as seen in FIG. 5; to but not through valves V11, V14 and V23; and to and through valve V2 to valves V6 and V25 in both of which the fluid under pressure is initially blocked. The various functions of these elements initially so conditioned will be described at the appropriate point in the following portion of the description of this apparatus.

In the apparatus embodying the instant invention illustrated schematically in FIG. 5, the push button PB is depressed momentarily to initiate a full cycle of operation after a crankshaft W is loaded into the apparatus as shown. When push button PB is depressed the control relay 4CR is energized through normally open now closed contacts of control relay 29CR and the normally open now closed contacts of time delay relay 1TR to close two sets of normally open contacts, one set of which establishes a holding circuit to maintain relay 4CR energized and the other of which energizes solenoid S8 shifting valve V8 to the right. This movement of valve V8 admits fluid under pressure to the left hand end of cylinder 54 so that the end-wise locator, steadyrest and gage assembly 31 is moved to the right as seen in FIG. 5 into its operative position relative to the crankpin to be ground. This movement of the assembly 31 releases the normally open contacts of limit switch 6LS to interrupt the circuit including these contacts.

When the lever 58 pivotally supported upon the assembly 31 contacts the crankpin to be ground as shown in FIG. 5, it is displaced clockwise to actuate the limit switch 9LS, closing its normally open contacts to energize the time delay relay 4TR which thereafter closes its normally open contacts after a short delay, thereby energizing the solenoid S9 through the normally closed contacts of the control relay 10CR and a second time delay relay 5TR. When the solenoid S9 is energized, the valve V9 shifts to the right to admit fluid under pressure to cylinder 56 at the lower end thereof as shown in FIG. 5 to displace the piston contained therein. The piston is provided with a rack engaging a gear effective when the piston is so displaced to rotate the end-wise locator counterclockwise as seen in FIG. 9 to align the crankpin to be ground precisely axially of the grinding wheel 21.

The showing of the end-wise locator, steadyrest and gage assembly in FIG. 5 is a simplified schematic representation since this assembly may be constructed according to the teachings of the patent to Joyce mentioned above which describes such an assembly in detail. However, it is to be understood that the assembly 31 includes means not shown automatically operable to place and maintain the steadyrest elements and the gage in operative engagement with the crankpin to be ground. When the head of the in-process gage G1 is initially positioned to engagement with a crankpin to be ground, the contacts S2CR of the air gage G1 are closed.

When the time delay relay 5TR is energized, its normally open contacts are closed immediately to set up a second holding circuit for the control relay 4CR, so that control relay 4CR and solenoid S8 controlled thereby will remain energized when the first holding circuit therefor is interrupted by the deenergization of control relay 29CR.

The energization of time delay relay 5TR also initiates a timing period long enough for the end-wise locating or spark splitting operation after which the normally closed contacts of time delay relay 5TR open and remain open to de-energize the solenoid S5 allowing the spring biased valve V5 to shift to the left to the position shown in FIG. 5. With valve V5 disposed as shown in FIG. 5, valve V55 is connected to exhaust so that valve V55 is spring biased to the right as seen in FIG. 5 to prevent the passage of fluid through valve V55.

When the valve V5 is shifted to the left, fluid under pressure passes through valve V5, a check valve, valve V15, and valve or valves V15a into cylinders 39a and 39b to actuate the clamping jaws 37 to secure the crankshaft W in the proper precisely aligned axial position for proper engagement of the grinding wheel 21 with the crankpin to be ground. At the same time fluid under pressure is admitted to the larger end of cylinder or cylinders 39c to move the piston contained therein to the bottom of cylinder 39c as seen in FIG. 5 because the force exerted on the larger end of the piston is greater than the force exerted on the smaller end of the piston. At the same time, fluid pressure is applied to actuate the pressure switches 2PS and 3PS to close the normally open contacts of these switches and to open the normally closed contacts of pressure switch 3PS to prevent the energization of solenoid S19 during the grinding cycle. With solenoid S19 deenergized, valve V19 is disposed as shown in FIG. 5 to admit fluid under pressure to the left hand side of piston 82 as seen in FIGS. 1 and 5 so that piston 82 is biased to the right in cylinder 83 as shown in FIG. 5 and illustrated best in FIG. 1.

With the normally open contacts of pressure switches 2PS and 3PS and the normally open contacts S2CR of gage G1 held closed, the circuit from line L1 is completed to energize control relays 10CR and 10ACR and solenoid S2 simultaneously.

The energization of control relay 10CR opens its normally closed contacts to de-energize solenoid S9 allowing valve V9 to shift to the left as seen in FIG. 5 to admit fluid under pressure to the upper end of cylinder 56 as seen in FIG. 5 to rotate the end-wise locator to its retracted position by displacement of the piston contained in cylinder 56. When control relay 10CR is energized, its normally open contacts are closed to complete the second holding circuit for control relay 4CR through the contacts of time delay relays 1TR, 4TR and 5TR. The closing of the normally open contacts of control relay 10CR also completes a holding circuit for time delay relays 4TR and 5TR through the previously closed normally open contacts of limit switch 9LS and time delay relay 4TR.

The energization of control relay 10ACR closes its normally open contacts to energize control relay 30CR. When control relay 30CR is energized, its normally open contacts are closed to energize solenoid S1 and also to hold the control relay 30CR energized through the normally closed contacts of the control relay 13CR. When solenoid S1 is energized, it rotates the lever 123 clockwise as seen in FIG. 5 to lift the follower roll 122 out of the depressed camming surface 121 in the periphery of the circular camming element concentric with the work head 116 referred to above. When the lever 123 is so rotated by the solenoid S1, the normally closed contacts of the limit switch 7LS are allowed to close and the normally open contacts of limit switch 7LS are opened to deenergize the relay 29CR. At this point, the normally closed timed contacts of time delay relay 5TR connected in series with normally closed contacts of time delay relay 29CR remain open.

When solenoid S2 is energized the valve V2 is shifted to the right from the position shown in FIG. 5 to pass fluid under pressure to the rear of the wheel slide feed cylinder 15 to initiate movement of the rotating grinding wheel 21 into engagement with the crankpin to be ground according to a predetermined grinding cycle. As noted above, since the desired grinding cycle may be produced by any one of various wheel feed mechanisms already well known in the art, and since the wheel feed mechanism forms no part of the instant invention, this mechanism is illustrated in a simplified schematic form in FIG. 5.

When forward movement of the wheel slide 19 is initiated, the limit switch 1LS is released so that its normally open contacts open and its normally closed contacts close, the latter energizing the relay 1CR opening its normally closed contacts with no immediate effect on the system.

As the wheel slide 19 moves forward, the limit switch 3LS is actuated to close and hold closed its normally open contacts to initiate the operation of the work drive motor M1 to rotate the pot chucks 117 and 118 and thence the crankshaft W during the ensuing grinding operation. A one-way over-running clutch OC located in a sprocket of the drive train inter-connecting the motors M1 and M3 and shaft 29 through timing belts prevents the concurrent rotation of the hydraulic motor M3.

As is well known in the art, the grinding cycle may be terminated by automatic control means therefor including a timer and/or an air gage. As illustrated, this control means includes the air gage G1 operable when a crankpin is ground to size to open its contacts S2CR to de-energize the relays 10CR and 10ACR and the solenoid S2. When the control relay 10CR is deenergized, its normally open contacts are opened to deenergize control relay 4CR, opening its normally open contacts to de-energize solenoid S8 with the result that valve V8 shifts to the left as seen in FIG. 5 allowing fluid pressure to enter the right hand end of cylinder 57 to retract the end-wise locator, steadyrest and gage assembly 31 as a unit. As the assembly 31 is retracted, the lever 58 is disengaged from the ground crankpin so that the normally open contacts of limit switch 9LS are allowed to open to deenergize time delay relay 4TR and time delay relay 5TR. When the assembly 31 reaches its retracted position illustrated in FIG. 5, limit switch 6LS is actuated to close its normally open contacts.

The deenergization of control relay 10ACR at this time has no effect on control relay 30CR now held energized by the closed contacts of control relay 13CR.

When solenoid S2 is deenergized, valve V2 is allowed to shift to the left to the position illustrated in FIG. 5 to admit fluid under pressure to the forward end of cylinder 15 to retract the wheel slide 19.

As the wheel slide 19 is retracted after a grinding cycle is completed, the limit switch 3LS is released to open its normally open contacts to deenergize the work drive motor M1, with the result that motor M1 begins to slow down. When the wheel slide 19 reaches its fully retracted position as shown in FIG. 5, the normally closed contacts of limit switch 1LS are opened deenergizing control relay 1CR with the various results described below. At the same time the normally open contacts of limit switch 1LS are closed to complete a circuit through the now closed contacts of the limit switch 6LS to energize solenoid S6 to shift valve V6 to the right; to energize the solenoid S11 through the now closed contacts of limit switch 6LS and time delay relay 3TR to shift valve V11 to the right; and to energize time delay relay 3TR through the now closed contacts of limit switch 13LS; all with the various results described below.

The following description recites in detail the various coordinated operations initiated and controlled in the proper sequence to condition the system illustrated in FIG. 5 for and then accomplish concurrent axial and angular work piece indexing operations as required between successive grinding operations.

When control relay 1CR having two sets of normally closed contacts is deenergized as described above, power passes from the line L1 through selector switch SS, and now closed contacts of time delay relay 5TR and control relay 29CR, and through one set of normally closed contacts of control relay 1CR to energize solenoid S15. Solenoid S15 shifts valve V15 to the right passing fluid under pressure to the right-hand end of valve or valves V15a to move valve or valves V15a to the left as seen in FIG. 5. This movement of the valve or valves V15a blocks the main exhaust port from the cylinders 39a and 39b controlling the clamping jaws 37 at the same time that it connects the large end of the cylinder or cylinders 39c to exhaust. Under this condition the piston in each cylinder 39c is biased into engagement with an adjustable stop screw so that a predetermined volume of oil from the cylinders 39a and 39b is admitted to the small end of cylinder or cylinders 39c in order to reduce the force exerted on the work piece by each of the respective clamping jaws 37 while the auxiliary clamping elements 91 supported upon these jaws are maintained in frictional contact with the crankshaft W by means of the relatively reduced pressure now applied to the pistons in the respective cylinders 39a and 39b. Oil is also exhausted from the pressure switch 3PS through valve V15a to open its normally open contacts and to close its normally closed contacts.

The simultaneous closing of the other set of normally closed contacts of control relay 1CR passes power from the line L1 through this set of contacts and through the now closed contacts of limit switch 7LS to energize the solenoids S13 and S14, respectively effective to shift valves V13 and V14 to the right as seen in FIG. 5. With valves V13 and V14 so disposed, fluid under pressure passes through valve V14 to one side of the relatively low speed hydraulic motor M3 and the fluid is exhausted from motor M3 through valve V13 at a rate controlled by the throttle valve T13 sufficient to produce the desired rate of rotation of the motor M1 and hence the crankshaft W during the angular indexing operation. The fluid is not exhausted through throttle valve T14 and valve V14 at this time because the throttle valve T13 is set to permit a faster rate of flow than that permitted by throttle valve T14.

As noted above, the closing of the normally open contacts of limit switch 1LS energizes the solenoid S6 to shift the valve V6 to the right as seen in FIG. 5 thereby passing fluid under pressure to and through valve V22c to valve V23, since valve V11 is shifted to the right by concurrent energization of solenoid S11 to admit fluid under pressure to the side of the piston in valve V22c having the largest area so that this piston is moved to the right as seen in FIG. 5 against the relatively smaller force exerted by fluid under pressure against the smaller end of the piston.

The fluid under pressure admitted to the valve V23 through valve V22c moves the piston contained therein and the attached plunger 87 out of engagement with a notch 89 in the notch bar 88 for a short interval controlled by the time delay relay 3TR energized with solenoid S11. After a predetermined short time interval, the energized time delay relay 3TR operates to open its normally closed contacts deenergizing solenoid S11 so that valve V11 shifts to the left to the position shown in FIG. 5 so that the left hand end of valve V22c is connected to exhaust with the result that the piston in valve V22c is shifted to the left as seen in FIG. 5. With the upper end of valve V23 as seen in FIG. 5 thus connected to exhaust, plunger 87 attached to the piston in valve V23 is allowed to ride on the surface of the notch bar 88 until it enters the next notch 89.

Each time that the plunger 87 attached to the piston contained in valve V23 is displaced by that piston for disengagement from a notch 89 in the notch bar 88, fluid under pressure is passed through valve V23 to and through the rotary valve V65 and thence through a dog operated reversing valve V65a to move the piston of valve V22a to the right as seen in FIG. 5. Fluid under pressure then passes through valve V6 and through valve V22a to shift valve V25 to the right from the centered position shown in FIG. 5 in order to admit fluid under pressure into the left hand end of table traversing cylinder 28 as seen in FIG. 5 through valve V2 and valve V25 to move the traversing table assembly 23 to the left. At the same time, fluid is exhausted from the right hand side of table traversing cylinder 28 through valves V25 and V23 and a throttle valve T23.

As the traversing table assembly 23 moves to the left from the position illustrated in FIG. 5 and thus out of the position for grinding crankpin #6, the limit switch 21LS is released so that its contacts open with no immediate effect because control relay 29CR is already deenergized.

The showing of the cylinder 28 and the associated piston in FIG. 5 represents an arrangement of the table traversing mechanism already well known in the art in which a traversing cylinder fixedly secured to the traversing table assembly encloses a piston supported by and fixedly secured longitudinally of the machine base on which the traversing table is slidably supported.

As noted above, the plunger 87 is allowed to ride on the surface of the notch bar 88 when the time delay relay 3TR times out de-energizing the solenoid S11 controlling the valve V22c. When the traversing table assembly 23 reaches the position in which the next crankpin to be ground is disposed substantially in proper axial alignment with the grinding wheel 21, the plunger 87 drops into the next notch 89 with the resultant that the piston of valve V23 is displaced so that the flow of fluid under pressure to the valve V22a through valves V23, V65 and V65a is cut-off. The piston of valve V22a is returned to the left hand position illustrated in FIG. 5 cutting off the flow of fluid under pressure to valve V25 which returns to its centered position to terminate the movement of the traversing table assembly 23.

When the plunger 87 is withdrawn from a notch 88 in the manner described above, the limit switch 10LS is released to open its normally open contacts deenergizing time delay relay 1TR so that its contacts open immediately. When the limit switch 10LS is released, power is supplied from the line L1 through closed contacts of limit switch 1LS, time delay relay 2TR and the normally closed contacts of limit switch 10LS to the normally open contacts of a series of limit switches 15LS, 16LS and 17LS respectively actuated as required by individual dogs attached to and traversed with the traversing table assembly 23. The contacts of the respective limit switches 15LS, 16LS and 17LS when closed respectively energize time delay relays 15TR, 16TR and 17TR, each having one set of contacts timed to open on deenergization.

As the traversing table assembly 23 starts to move to the left from the position shown in FIG. 5, the limit switch 15LS is actuated by the dog controlling that switch so that its normally open contacts are closed and held closed for a predetermined time interval, thereby energizing time delay relay 15TR to close two sets of normally open contacts respectively energizing solenoids S16 and S19 to shift the pistons of valves V16 and V19 to the right as seen in FIG. 5.

With the solenoid S19 energized through the normally closed contacts of pressure switch 3PS, the valve V19 is shifted to the right as seen in FIG. 5 so that fluid is exhausted from the left hand end of the cylinder 83 of the clutch assembly 81 controlling the angular positioning assembly 61. Concurrently, fluid under pressure is admitted to the right hand end of the cylinder 83 through valve V19 to move piston 82 toward the left hand end of cylinder 83 into its retracted position in which the locating pin 85 is fully disengaged from the surface provided with recesses 86.

When valve V16 is shifted to the right by energization of the solenoid S16, fluid under pressure is passed from the relatively high pressure supply line through the throttle valve T1 and a relief valve Va set to provide a supply of fluid at a relatively lower pressure and into the cylinder 16 of the actuating means 47 disposed in axial alignment with crankpin #2 to move the camming element assembly 41 controlled thereby into its operative position in the path of crankpin #2 disposed on the same axis as crankpin #5, the next pin to be ground. If a relatively lower fluid pressure is not required for the reason noted further below, throttle valve T1 and relief valve Va may be eliminated.

Since crankpin #2 is initially disposed eccentric of the axis of rotation of the work heads 115 and 116, the basic rotation of the crankshaft W with the pot chucks 117 and 118 about the axis of rotation of the work heads 115 and 116 is modified by positively controlled counterrotation of the crankshaft about its main bearings from the instant crankpin #2 engages the camming surface of the operatively positioned camming element assembly 41 until crankpin #2 and crankpin #5 disposed coaxially with crankpin #2 are disposed coincident with the axis of rotation of the work heads 115 and 116.

The same result could of course be accomplished by an operatively positioned camming element assembly 41 so disposed as to be engaged by crankpin #5. Moreover, a camming element assembly 41 so disposed could be actuated as required to position each of the coaxially disposed crankpins #5 and #2 for a grinding operation.

As the traversing table assembly continues to move to the left as seen in FIG. 5, the dog which actuates limit switch 15LS moves out of engagement with this limit switch allowing its normally open contacts to open to deenergize the time delay relay 15TR.

When time delay relay 15TR is deenergized, one set of normally open contacts thereof opens immediately deenergizing solenoid S19 allowing the valve V19 to shift to the left as seen in FIG. 5 to connect the right hand end of cylinder 83 to exhaust and to pass fluid under pressure to the left hand end of the cylinder 83 of the clutch assembly 81 to move the piston 82 to the right so that the locating pin 85 is fully engaged with one of the recesses 86 to secure the angular positioning assembly 61 and hence the crankshaft W in the precise angular position for grinding crankpin #5.

While not so indicated in the simplified schematic showing in FIG. 5, the hydraulic line interconnecting the right hand end of cylinder 83 and valve V19 must pass through a suitable rotary coupling in the work head 115 in the manner suggested by the more detailed showing in FIG. 1.

At a predetermined short interval after the time delay relay 15TR is deenergized, its timed contacts open to deenergize the solenoid S16 allowing valve V16 to shift to the left as seen in FIG. 5 so that cylinder 16 is actuated to retract the camming element assembly 41 controlled thereby from its operative position.

When the plunger 87 connected to the piston of the valve V23 enters the next notch 89 in the notch bar 88 as described above, the limit switch 10LS is actuated opening its normally closed contacts to break the circuit through which power is supplied to the normally open contacts of the limit switches 15LS, 16LS and 17LS.

When the limit switch 10LS is actuated, its normally open contacts are closed to energize the time delay relay 1TR through the normally closed contacts of limit switch 18LS so that the normally open contacts of time delay relay 1TR will be closed after a short time interval to set up a circuit for initiating the next grinding operation, if the normally closed contacts of limit switch 18LS are not opened during that time interval.

The limit switch 18LS shown in FIGS. 1 and 5 is actuated by means responsive to the axial position of the piston 82 and the circular plate 71, such as a bell crank 121 best illustrated in FIG. 1. The bell crank 121 provided with a camming element 132 at the end of one arm thereof is rotatably supported in a suitable recess in the pot chuck 117 with the end of the other arm thereof maintained in engagement with the circular plate 71 by suitable biasing means such as the spring 134. When the piston 82 and the associated circular plate 71 are disposed as shown in FIG. 1, with the locating pin 85 seated in one of the recesses 86, the bell crank 131 is disposed so that the camming element 132 is maintained out of engagement with the plunger of the limit switch 18LS with the result that a circuit including the normally closed contacts of limit switch 18LS remains energized long enough to close the normally open contacts of time delay relay 1TR. On the other hand, whenever the piston 82 and the associated circular plate 171 are so disposed that the locating pin 85 is not fully seated in a recess 86, the bell crank 131 is rotated clockwise as seen in FIG. 1 so that the camming element 132 engages and displaces the plunger of limit switch 18LS to open its normally closed contacts each time that the bell crank 131 rotating with the pot chuck 117 passes the limit switch 18LS fixedly secured to the grinding machine.

When the normally open contacts of time delay relay 1TR are closed by uninterrupted energization of time delay relay 1TR for a predetermined time interval, control relay 4CR is energized, in this instance, through normally closed contacts of control relay 29CR to initiate the sequence of operations necessarily completed preliminary to and during the grinding operation on crankpin #5. These operations are performed in the same manner and by the same means described in detail above with respect to the initial grinding operation performed upon crankpin #6, with the exception of the fact that energization of control relay 10ACR has no effect on the condition of control relay 30CR during this grinding operation because control relay 30CR is already held energized through the normally closed contacts of the control relay 13CR. Since control relay 30CR remains energized throughout the full cycle of operation on the entire crankshaft W after control relay 10ACR is first energized during the initial grinding operation on crankpin #6, the normally open contacts of limit switch 7LS remain open for the remainder of the full cycle of operation until control relay 13CR is energized by actuating limit switch 11LS in the manner and for the reason described further below. Since control relay 29CR remains deenergized as long as the normally open contacts of limit switch 7LS remain open, the circuit through which the second and subsequent grinding operations are initiated for crankpins #5 through #1 necessarily includes normally closed contacts of control relay 29CR.

When the grinding operation on crankpin #5 is terminated by opening the contacts S2CR of gage G1 with the resulting sequence of operations described above, the crankshaft W is automatically axially and angularly indexed to position crankpin #4 and the grinding operation is performed on crankpin #4 until it is terminated by opening the contacts S2CR of gage G1. From inspection of the showing in FIG. 5 it will be evident that crankpin #4 is angularly positioned when the dog controlling the limit switch 16LS actuates limit switch 16LS to close its normally open contacts energizing time delay relay 16TR closing two sets of normally open contacts, the first to energize solenoid S17 to disengage the locating pin 85 from a recess 86 in the manner described above and the second to energize the solenoid S17 to shift the valve V17 to the right as seen in FIG. 5 so that the piston in cylinder 17 is displaced to place the camming element assembly 41 controlled thereby in its operative position in the path of crankpin #4. Since crankpins #4 and #3 of the crankshaft W illustrated are coaxially disposed, the camming element assembly 41 for angularly indexing these crankpins would be equally effective if it were disposed in axial alignment with crankpin #3.

Noting that crankpin #3 is ground immediately after crankpin #4 and that crankpin #3 as shown is disposed coaxially with the crankpin #4, there is no need to angularly index the crankshaft between the grinding operation on crankpin #4 and the subsequent grinding operation on crankpin #3. Therefore, the sequence of operations performed preliminary to grinding crankpin #3 is modified to the extent that the various operations necessarily performed in connection with the angularly indexing operation are eliminated in this instance.

As noted further above, this variation in the automatic sequence of operations is controlled by a plunger 111 slidably supported on notch bar 88 with one end projecting into the notch 89 corresponding to the grinding position for crankpin #4 so that it is displaced when the axial indexing plunger 87 enters that notch. This displacement of the plunger 111 by the plunger 87 actuates the limit switch 19LS closing its normally open contacts to energize the time delay relay 2TR opening its normally closed contacts timed to close a predetermined interval after time delay relay 2TR is deenergized. The limit switch 19LS is released when the plunger 87 is withdrawn from the slot 89 intersected by the plunger 111 after the grinding operation on the crankpin #4 is completed. However, the normally closed contacts of time delay relay 2TR are timed to stay open for a period longer than it takes to index the traversing table assembly 23 to the point at which the plunger 87 enters the notch 89 corresponding to the axial position in which crankpin #3 is ground.

As indicated in the above description of the operating sequence, the normally closed contacts of limit switch 10LS must be closed in order to energize solenoid S19 to effect the withdrawal of locating pin 85 from one of the recesses 86 and to energize solenoid S17 to actuate the camming element assembly 41 controlled by cylinder 17, and since these normally closed contacts are only closed while the plunger 87 is withdrawn from the notches 89 and riding on the surface of notch bar 88, it will be evident that the closing of these contacts of limit switch 10LS will have no effect between the grinding operation on crankpin #4 and the grinding operation on crankpin #3, because the contacts of time delay relay 2TR connected in series with these contacts of limit switch 10LS remain open throughout this entire period. Therefore, the opening of the contacts of time delay relay 2TR in the manner and for the period indicated above effectively prevents the withdrawal of locating pin 85 from a recess 86 and the actuating of a camming element assembly 41 prior to the grinding operation on crankpin #3.

Otherwise, the several operations required to position and to perform a grinding operation on crankpin #3 are performed as indicated above for the crankpins previously ground.

When the grinding operation on crankpin #3 is completed, the system illustrated in FIG. 5 operates automatically to position crankpin #2 for grinding both axially and angularly and to perform a grinding operation on crankpin #2. As the traversing table assembly 23 moves further to the left as seen in FIG. 5 to position crankpin #2 axially for a grinding operation, the limit switch 15LS is actuated again by a second dog so disposed as to engage limit switch 15LS. When limit switch 15LS is actuated, its normally open contacts are closed to energize time delay relay 15TR again thereby closing its two sets of normally open contacts respectively effective when closed to energize solenoid S19 controlling valve V19 and solenoid S16 controlling valve V16. As noted above, with solenoid S19 energized, the valve V19 is so disposed that the piston 82 is moved to its retracted position within cylinder 83 of the clutch asesmbly 81 so that the locating pin 85 is disengaged from the recess 86, and, with solenoid S16 energized, the valve V16 is so disposed that the piston in cylinder 16 is displaced from the position illustrated in FIG. 5 to move the camming element assembly 41 controlled thereby again into its operative position in the path of crankpin #2.

When the grinding operation on crankpin #2 is completed, the system illustrated in FIG. 5 operates automatically to position crankpin #1 for grinding both axially and angularly and to perform the grinding operation on crankpin #1. As the traversing table assembly 23 moves further to the left as seen in FIG. 5 to position crankpin #1 axially for a grinding operation, the limit switch 17LS is actuated by a dog secured to the traversing table assembly 23. When limit switch 17LS is actuated, its normally open contacts are closed to energize time delay relay 17TR thereby closing its two sets of normally open contacts respectively effective when closed to energize solenoid S19 controlling valve V19 and solenoid S18 controlling valve V18. With solenoid S19 energized, the valve V19 is once again displaced so that the locating pin 85 is withdrawn in the manner described above from engagement with one of the recesses 86 and when the solenoid S18 is energized, valve V18 is shifted to position the camming element assembly 41 controlled thereby in its operative position in the path of crankpin #6 disposed coaxially with crankpin #1.

At the end of the axial indexing movement for positioning crankpin #1 the plunger 87 drops into the last notch 89 on the right hand end of notch bar 88 as seen in FIG. 5 displacing a second plunger 111 to actuate the limit switch 19LS to close its normally open contacts and thereby energize the time delay relay 2TR. With time delay relay 2TR energized so that its normally closed contacts are opened and held open for a predetermined time interval, the release of the limit switch 10LS by the withdrawal of the plunger 87 at the end of the grinding operation on crankpin #1 does not result in the energization of solenoid S19 controlling the clutch assembly 81 or the energization of solenoid S18 controlling the cylinder 18 connected to the camming element assembly 41 disposed in axial alignment with crankpin #6. In this manner, the angular indexing operation is by-passed once more because it is not required between the grinding operation on crankpin #1 and the grinding operation on crankpin #6 of the next shaft to be ground which will be disposed in the position coaxial with crankpin #1 now occupied by crankpin #6 of the crankshaft being ground.

After crankpin #1 is ground in the manner described above with respect to the crankpins previously ground, the plunger 87 is withdrawn from the notch 89 so that plunger 111 is displaced allowing limit switch 19LS to open deenergizing time delay relay 2TR having normally closed contacts timed to close a predetermined time interval after deenergization longer than the time interval required to seat the plunger 87 in the next notch 89. The traversing table assembly 23 moves further to the left a short distance until dog 139 trips lever 137 to shift the reversing valve V65a to the right as seen in FIG. 5 and to actuate the limit switch 11LS.

Recalling that the limit switch 1LS is actuated to close its normally open contacts when the wheel slide 19 is fully retracted and further that the closing of these normally open contacts energizes the solenoid S6 to shift the valve V6 to the right as seen in FIG. 5, the movement of valve V65a to the right effected by lever 137 allows fluid under pressure passing through valve V23 and valve V65 to enter the left hand end of valve V22b as seen in FIG. 5 through valve V65a, moving valve V22b to the right, thereby allowing fluid under pressure to pass through valve V6 and through valve V22b to the right hand end of valve V25 as seen in FIG. 5, displacing valve V25 to the left from its centered position. With valve V25 so disposed, fluid under pressure is admitted to the right hand side of cylinder 28 as seen in FIG. 5 to move the traversing table assembly 23 to the right as fluid is exhausted from the left hand end of cylinder 28 through valve V23 and throttle valve T23.

When limit switch 11LS is actuated, its normally open contacts are closed to energize control relay 13CR closing a set of normally open contacts to energize control relay 17CR to open a set of normally closed contacts and to maintain solenoid S11 energized to maintain valve V11 shifted to the right after the contacts of time delay relay 3TR are opened. In this manner, valve V22c is maintained shifted to the right, and the plunger 87 attached to valve V23 is held retracted from the notch bar 88 while the traversing table assembly 23 is traversed to the right toward the starting position for the next full cycle of operation.

The energization of control relay 13CR also opens a set of normally closed contacts to deenergize control relay 30CR and thus deenergize solenoid S1 to allow the follower roll 122 supported by the spring biased lever 123 to roll on the circular camming element concentric with one of the work heads. The circuit through which solenoids S13 and S14 are normally energized including the normally closed contacts of limit switch 7LS is maintained energized after solenoid S1 is deenergized until the follower roll 122 drops into the depressed camming surface 121 when the pot chucks 117 and 118 are properly oriented for unloading and loading crankshafts. However, since control relay 17CR is now energized to open its normally closed contacts, the solenoid S13 connected in series with these contacts is not energized at this time so that valve V13 remains in the position shown in FIG. 5 to prevent the exhaust of fluid from motor M3 through throttle valve T13 and valve V13. On the other hand, since solenoid S14 remains energized until the normally closed contacts of limit switch 7LS are opened, valve V14 is positioned to admit fluid under pressure to the hydraulic motor M3 which rotates the work heads 115 and 116 at a rate controlled by the throttle valve T14 slower than the rate of rotation permitted by throttle valve T13 until the follower roll 122 drops into the depressed camming surface 121 actuating limit switch 7LS to deenergize solenoid S14 and thereby stop the hydraulic motor M3 with the pot chucks 117 and 118 properly disposed for unloading and loading crankshafts.

When the limit switch 7LS is actuated, its normally open contacts are closed to set up a circuit through the normally open contacts of limit switch 21LS which when closed energize the control relay 29CR shifting its contacts to a position opposite that shown in the drawing. In this position the set of normally open contacts of the control relay 29CR completes a circuit energizing solenoid S5 to shift the valve V5 to the right as seen in FIG. 5 so that it functions in the manner described further above to connect the hydraulic cylinders 39a and 39b to the exhaust side of the system. Return springs enclosed in the cylinders 39a and 39b as shown in FIG. 3 move the clamping jaws 37 to their open positions for unloading and loading crankshafts.

When the hydraulic cylinders 39a and 39b are connected to exhaust in the manner described above, the pressure switches 2PS and 3PS are also connected to exhaust so that they return to the respective positions illustrated in FIG. 5. With the normally open contacts of pressure switch 2PS open as shown, the circuits through which solenoids S6 and S11 are energized is interrupted and with the normally open contacts of pressure switch 3PS open as shown, the circuit through which control relays 10CR, 10ACR and solenoid S2 are energized is interrupted.

Meanwhile, the traversing table assembly 23 continues to move to the right without actuating any of the limit switches 15LS, 16LS, and 17LS because these switches are equipped with one-way operating rollers. The movement of the traversing table assembly 23 to the right continues past the position for grinding crankpin #6 before the dog 138 trips the lever 137 to return the reversing valve 65a to the position shown in FIG. 5 so that valve V22b is connected to exhaust and valve V22a is shifted to the right as seen in FIG. 5 to initiate movement of the traversing table assembly 23 to the left. When the lever 137 is actuated by the dog 138, the normally open contacts of limit switch 11LS are opened to deenergize control relay 13CR so that solenoid S11 is deenergized to allow valve V11 to shift to the left so that valve 22C is shifted to the left in the manner described further above allowing the plunger 87 to ride the surface of the notch bar 88 as the table traversing assembly 23 moves to the left until plunger 87 enters the notch 89 corresponding to the grinding position of crankpin #6, closing the normally open contacts of limit switch 10LS and thereby energizing the time delay relay 1TR to set up the circuit for initiating the next full cycle of operation.

In order to assure the completion of the table traversing operation to the grinding position for crankpin #6 before the solenoid S6 is deenergized, the circuit for energizing control relay 29CR including the normally open contacts of limit switch 7LS also includes the normally open contacts of limit switch 21LS so that this circuit is not completed until limit switch 21LS is actuated by a suitable dog when the traversing table assembly 23 reaches the grinding position for crankpin #6. Notwithstanding the simplified schematic representation in FIG. 5 of the dog associated with limit switch 21LS, it is to be understood that this dog may in fact be adjustably secured to and dependent from the traversing table assembly 23 in the manner indicated in FIG. 5 for the respective dogs associated with limit switches 15LS, 16LS and 17LS. As indicated in FIG. 5, the limit switch 21LS may be equipped with a one-way operating roller so that it is not actuated by the associated dog as the traversing table assembly 23 moves to the right past the position for grinding crankpin #6. However, limit switch 21LS will be actuated to close its normally open contacts and complete the circuit for energizing control relay 29CR as the traversing table assembly 23 returns to the left to the position shown in FIG. 5 for grinding crankpin #6.

It is to be understood that the embodiment of the instant invention described herein and illustrated in the accompanying drawings is illustrative only and that the details of this embodiment are not to be considered in a limiting sense, since various modifications of the instant invention are contemplated within the scope of the claims appended hereto.

Many variations of the structure illustrated are contemplated within the scope of the instant invention as illustrated in the following examples.

While the camming element assembly 41 is illustrated as comprising a bell crank 42 with a relatively enlarged camming roller 46 rotatably supported at one end thereof adjacent a generally planar camming surface disposed in a plane intersecting the periphery of the roller 46, it is to be understood that this camming surface may be arcuately curved so that it is disposed substantially tangential to the surface of the roller 46 at the end adjacent the roller 46. In fact, the camming surface provided on the bell crank 42 for indexing the crankshaft W may consist entirely of a suitably disposed flat or curved camming surface on an element fixedly secured to the bell crank 42.

Since it is posible that first contact between a crankpin and the camming roller 46 of the camming element assembly may occur at a point on a line intersecting the axis of rotation of work heads 115 and 116 and the axis of rotation of the bearing assembly 48 supporting the camming roller 46 temporarily blocking the movement of the camming element assembly 41 into its operative position, the fluid pressure supply for the respective actuating means 47 may include means such as the throttle valve T*l* and the relief valve V*a* illustrated in FIG. 5 to limit the pressure applied to each of cylinders 16, 17 and 18 and thereby to allow the actuating means 47 to yield temporarily until a crankpin has been rotated past this point after which the camming element assembly 41 continues to move into its operative position for engagement with a crankpin during the next revolution of the crankshaft W. However, the configuration of the cylinders 16, 17 and 18 may be such that the actuating means 47 will respond in this manner as necessary under full line pressure, in which case throttle valve T*l* and relief valve V*a* may be eliminated.

Since the crankshaft W is rotated relatively slowly by the motor M3 for the angular indexing operation, and since this angular indexing operation is always completed within two rotations of the crankshaft W, the rotation of the crankshaft W by motor M3 may be stopped briefly after two full rotations so that precise endwise location may be performed with the crankshaft at rest when the crankshaft is characterized by crankpin shoulders too low to accommodate an endwise locating mechanism provided with rotating camming elements as illustrated in FIG. 9. In such an embodiment of the instant invention the camming elements of the endwise locator may be constructed as illustrated and described in the patent to Joyce mentioned above.

As shown, the limit switch 18LS is disposed so that it is actuated intermittently once during each rotation of the work heads by the camming element 132 of the bell crank 131 whenever the locating pin 85 is not fully seated in one of the recesses 86. However, it is to be understood that limit switch 18LS may be mounted on the rear of the work head 115 so that it is actuated by a plunger disposed on the axis of rotation of the work head 115 whenever the locating pin 85 is not fully seated in one of the recesses 86. With such an arrangement for controlling the normally closed contacts of limit switch 18LS, the time delay relay 1TR may be eliminated from the circuit illustrated in FIG. 5.

What is claimed is:

1. In a machine tool for performing a series of machining operations upon predetermined eccentric portions of an elongated work piece spaced both axially and angularly of a work piece as well as eccentric to its longitudinal axis while such a work piece is supported by and rotated with rotatable work piece supporting means, axial indexing means automatically operable between successive machining operations to position successive predetermined eccentric portions of such a work piece axially for the next machining operation, and angular indexing means automatically operable between successive machining operations by direct engagement successively with different predetermined eccentric portions of such a rotating work piece to position successive predetermined eccentric portions of such a work piece angularly for the next machining operation.

2. In a machine tool having power driven rotatable work piece supporting means and automatically operable to perform a series of machining operations upon predetermined eccentric portions of an elongated work piece spaced both axially and angularly of a work piece as well as eccentric to its longitudinal axis, axial indexing means automatically operable between successive machining operations to position successive predetermined eccentric portions of such a work piece axially for the next machining operation, and angular indexing means automatically operable between successive machining operations including retractable work piece camming means selectively positioned for direct engagement successively with different predetermined eccentric portions of such a rotating work piece to position successive predetermined eccentric portions of such a work piece angularly for the next machining operation.

3. In a machine tool having a rotatable work piece supporting means and operable to perform a series of machining operations upon predetermined eccentric portions of an elongated work piece spaced both axially and angularly of a work piece as well as eccentric to its longitudinal axis, axial indexing means automatically operable between successive machining operations to position successive predetermined eccentric portions of such a work piece axially for the next machining operation, angular indexing means automatically operable between successive machining operations by direct engagement successively with different predetermined eccentric portions of such a work piece rotating with rotatable supporting means therefor to properly position successive predetermined eccentric portions of such a work piece for the next machining operation, and by-pass means actuated by operation of said axial indexing means operable to inactivate said angular indexing means when the predetermined eccentric portion of such a work piece subject to the next machining operation is coaxial with the predetermined eccentric portion of such a work piece that was subject to the previous machining operation.

4. In a machine tool for performing a series of machining operations upon predetermined eccentric portions of an elongated work piece spaced both axially and angularly of a work piece as well as eccentric to its longitudinal axis, axial indexing means automatically operable between successive machining operations to position successive predetermined eccentric portions of such a work piece axially for the next machining operation, angular indexing means automatically operable between successive machining operations including retractable work piece camming means selectively positioned for direct engagement successively with different predetermined eccentric portions of a rotating work piece to position successive predetermined eccentric portions of such a work piece for the next machining operation, and by-pass means actuated by said axial indexing means operable to maintain said work piece camming means of said angular indexing means retracted when the predetermined eccentric portion of such a work piece subject to the next machining operation is coaxial with the predetermined eccentric portion of such a work piece that was subject to the previous machining operation.

5. In a crankpin grinding machine having power driven rotatable work piece supporting means and means operable automatically to perform a series of grinding operations upon the respective crankpins of a crankshaft, axial indexing means automatically operable in the intervals between successive grinding operations to position successive crankpins for the next grinding operation, angular indexing means automatically operable in the same intervals between successive grinding operations by engagement with a crankpin of a rotating crankshaft to position successive crankpins angularly for the next grinding operation, and by-pass means actuated during a given interval by said axial indexing means operable to inactivate said angular indexing means during the next succeeding interval when the crankpin subject to the next grinding operation is coaxial with the crankpin subject to the previous grinding operation.

6. In a machine tool having a rotatable work holding means for supporting a work piece eccentrically of the axis of rotation of the work holding means, retaining means for a work piece mounted upon the rotatable work holding means operable during a machining operation to secure a work piece fixedly relative to the work holding means about a predetermined axis spaced from the axis of rotation of the work holding means and operable during an angular indexing operation to allow rotation of a work piece relative to the work holding means about said predetermined axis subject to frictional constraint, and a work piece angular indexing means including a work piece camming element selectively movable during an angular indexing operation from a first postion clear of a work piece to a second position in the path of a predetermined portion of a work piece initially disposed eccentrically of the axis of rotation of the work holding means while the work holding means is rotating so that a work piece engaged thereby is angularly displaced relative to the work holding means through the angle necessary to position a predetermined portion of a work piece on the axis of rotation of the work holding means.

7. In a machine tool having a rotatable work holding means for supporting a work piece eccentrically of the axis of rotation of the work holding means, releasable retaining means for a work piece mounted upon the rotatable work holding means operable in a first work piece retaining mode during a machining operation to secure a work piece fixedly relative to the work holding means about a predetermined axis parallel to the axis of the work holding means and operable in a second work piece retaining mode during an angular indexing operation to constrain a work piece against rotation relative to the work holding means about said predetermined axis without prohibiting the relative angular displacement effected during an angular indexing operation, and a work piece angular indexing means including a work piece camming element selectively movable during an angular indexing operation from a first position clear of the work piece to and from a second position in the path of a predetermined cylindrical portion of a work piece initially disposed eccentrically of the axis of rotation of the work holding means while the work holding means is rotating so that a work piece engaged thereby is rotated relative to the work holding means to position the central axis of a predetermined cylindrical portion of a work piece coincident with the axis of rotation of the work holding means.

8. In a machine tool having a rotatable work holding means for supporting a work piece eccentrically of the axis of rotation of the work holding means, releasable retaining means for a work piece mounted upon the rotatable work holding means operable in a first retaining mode during a machining operation to secure a work piece fixedly relative to the work holding means about a predetermined axis parallel to the axis of the work holding means and operable in a second retaining mode during an angular indexing operation to constrain a work piece only frictionally against rotation relative to the work holding means about said predetermined axis so that the required relative rotation may be effected during an angular indexing operation, and a work piece angular indexing means including a work piece camming element selectively movable during an angular indexing operation from a first position clear of the work piece into and then out of a second position in the path of a predetermined portion of a work piece initially disposed eccentrically of the axis of rotation of the work holding means while the work piece holding means is rotating with said retaining means operating in said second mode so that a work piece engaged thereby is rotated relative to the work holding means to position a predetermined portion of a work piece on the axis of rotation of the work holding means.

9. A device as described in claim 8, and in addition, by-pass means selectively operable automatically to inactivate said work piece angular indexing means whenever the next predetermined portion of a work piece to be subjected to a machining operation is disposed coaxially with the last predetermined portion of a work piece subjected to a machining operation.

10. In a machine tool having a rotatable work holding means for supporting a work piece eccentrically of the axis of rotation of the work holding means, releasable retaining means for a work piece mounted upon the rotatable work holding means operable in a first retaining mode during a machining operation to secure a work piece fixedly relative to the work holding means about a predetermined axis parallel to the axis of the work holding means and operable in a second retaining mode during an angular indexing operation to constrain a work piece only frictionally against rotation relative to the work holding means about said predetermined axis so that the required relative rotation may be effected during an angular indexing operation, and a work piece angular indexing means including a plurality of camming element assemblies each including a rotatably mounted camming element and an independently operable actuating means therefor and control means for the respective actuating means operable to produce selective movement of the respective camming elements during predetermined angular indexing operations from a first position clear of the work piece into and then out of a second position in the path of a predetermined portion of a work piece initially disposed eccentrically of the axis of rotation of the work holding means while the work holding means is rotating with said retaining means operating in said second mode so that a work piece engaged thereby is rotated relative to the work holding means to position a predetermined portion of a work piece on the axis of rotation of the work holding means.

11. A device as described in claim 10 and, in addition, work piece axial indexing means automatically operable concurrent with the operation of said work piece angular indexing means.

12. In a crankshaft grinding machine including a rotatable work holding means for supporting a crankshaft eccentrically of the axis of rotation of the work holding means with a given crankpin disposed concentrically of the axis of rotation of the work holding means for a grinding operation thereon, angular indexing means for a crankshaft so supported automatically operable between successive grinding operations on a crankshaft so supported positively to displace a rotating crankshaft relative to the work holding means in which it is supported by direct engagement with a crankpin thereof initially disposed eccentric of the axis of rotation of the work holding means so as to position the next crankpin to be ground concentrically of the axis of rotation of the work holding means.

13. In a crankshaft grinding machine including a rotatable work holding means for supporting a crankshaft eccentrically of the axis of rotation of the work holding means with a given crankpin disposed concentrically of the axis of rotation of the work holding means for a grinding operation thereon, angular indexing means for a crankshaft automatically operable between successive grinding operations on a crankshaft positively to displace a rotating crankshaft angularly relative to the work holding means by direct engagement with a crankpin so as to position the next crankpin to be ground coaxial with the axis of rotation of the work holding means, said angular indexing means including a retractable element having a camming surface selectively positioned in the path of a crankpin of a rotating crankshaft for an angular indexing operation and in a retracted position clear of a crankshaft for a grinding operation.

14. In a crankshaft grinding machine including a rotatable work holding means for supporting a crankshaft eccentrically of the axis of rotation of the work holding means with a given crankpin disposed concentrically of the axis of rotation of the work holding means for a grinding operation thereon, angular indexing means for a crankshaft automatically operable between successive grinding operations on a crankshaft to positively displace a crankshaft by direct engagement with a crankpin initially disposed eccentrically of the axis of rotation of the work holding means so as to position the next crankpin to be ground coaxial with the axis of rotation of the work holding means, said angular indexing means including a retractable element including a relatively fixed portion and a relatively rotatable portion together comprising a camming surface selectively positioned in the path of a crankpin of a rotating crankshaft for an angular indexing operation and in a retracted position for a grinding operation.

15. A device as described in claim 14 wherein the camming surface of said retractable element when disposed in the path of a rotating crankshaft includes a portion at one end thereof disposed in the path of a crankpin initially disposed eccentrically of the axis of rotation of the work holding means and a portion at the other end thereof disposed tangentially of a circle that would coincide with the surface of an unground crankpin located coaxially with the axis of rotation of the work holding means.

16. A device as described in claim 14, wherein said retractable element comprises a bell crank having a first arm pivotally connected at one end thereof to an actuating means and a second arm pivotally supporting a circular camming element at one end thereof, said camming surface including a relatively fixed elongated portion along the second arm of said bell crank and a relatively movable portion consisting of the surface of the circular camming element.

17. In a crankshaft grinding machine including a rotatable work holding means for supporting a crankshaft eccentrically of the axis of rotation of the work holding means with a given crankpin disposed concentrically of the axis of rotation of the work holding means for a grinding operation thereon, angular indexing means for a crankshaft automatically operable between successive grinding operations on a crankshaft to positively displace a crankshaft by direct engagement therewith so as to position the next crankpin to be ground coaxial with the axis of rotation of the work holding means, said angular indexing means including a plurality of retractable camming elements respectively disposed at spaced intervals along a crankshaft supported in the work holding means and in axial alignment with different crankpins and each including a portion movable in a plane perpendicular to the axis of rotation of the work holding means and provided with a camming surface selectively positioned in the path of an eccentrically disposed crankpin of a rotating crankshaft for predetermined angular indexing operations and in a retracted position throughout the several grinding operations.

18. In a crankshaft grinding machine including a rotatable work holding means for supporting a crankshaft eccentrically of the axis of rotation of the work holding means with a given crankpin disposed concentrically of the axis of rotation of the work holding means for a grinding operation thereon, axial indexing means for a crankshaft automatically operable between successive grinding operations on a crankshaft, angular indexing means for a crankshaft automatically operable concurrently with said axial indexing means between successive grinding operations on a crankshaft to positively displace a crankshaft by direct engagement therewith so as to position the next crankpin to be ground coaxial with the axis of rotation of the work holding means, said angular indexing means including a plurality of retractable indexing elements each having a camming surface selectively positioned in the path of a predetermined eccentrically disposed crankpin of a rotating crankshaft for an angular indexing operation and in a retracted position during the respective grinding operations.

19. In a crankshaft grinding machine including a rotatable work holding means for supporting a crankshaft eccentrically of the axis of rotation of the work holding means with a given crankpin disposed concentrically of the axis of rotation of the work holding means for a grinding operation thereon and angular indexing means for a crankshaft automatically operable between successive grinding operations, crankshaft retaining means including a precise angular positioning means having a first portion secured in fixed angular relation to a crankshaft and a second portion secured in fixed angular relation to the rotatable work holding means, the respective portions including facing surfaces one provided with a locating element projecting therefrom and the other provided with a plurality of angularly spaced recesses therein, and actuating means operable between successive grinding operations to displace one said portion axially relative to the other said portion in order to move said locating element out of and then into engagement with one of said recesses.

20. A device as described in claim 19, wherein the second said portion comprises an hydraulic cylinder fixedly secured to the work holding means with one inner end thereof forming one said facing surface and wherein the first said portion includes a piston assembly enclosed by said cylinder coupled non-rotatably to a crankshaft supported by the work holding means and including the other said facing surface, whereby said first and said second portions together with a suitable hydraulic control system therefor comprise said actuating means fully enclosing the facing surfaces and the locating element and recesses respectively associated therewith.

References Cited in the file of this patent
UNITED STATES PATENTS

| | | |
|---|---|---|
| Re. 24,091 | Rocks | Nov. 22, 1955 |
| 2,014,768 | Klingele | Sept. 17, 1935 |